B. M. TUCKER.
COMBINED MILKING STOOL AND PAIL SUPPORT.
APPLICATION FILED JAN. 24, 1911.
1,010,535.
Patented Dec. 5, 1911.
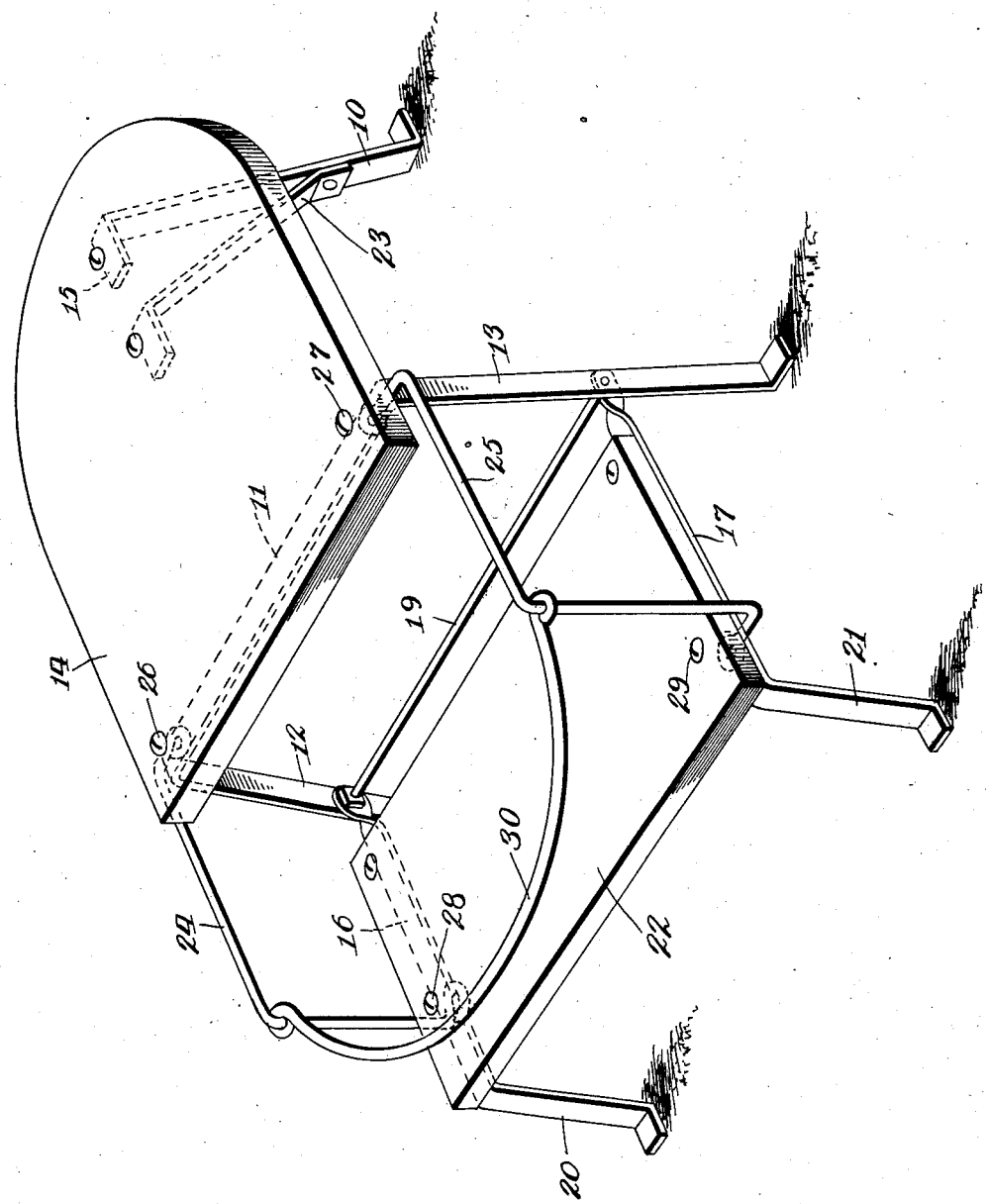
Inventor
B. M. Tucker
Witnesses
By
Attorneys.

UNITED STATES PATENT OFFICE.

BERTRAM M. TUCKER, OF MOOERS FORKS, NEW YORK.

COMBINED MILKING-STOOL AND PAIL-SUPPORT.

1,010,535. Specification of Letters Patent. Patented Dec. 5, 1911.

Application filed January 24, 1911. Serial No. 604,499.

*To all whom it may concern:*

Be it known that I, BERTRAM M. TUCKER, citizen of the United States, residing at Mooers Forks, in the county of Clinton and State of New York, have invented certain new and useful Improvements in Combined Milking-Stools and Pail-Supports, of which the following is a specification.

This invention relates to improvements in combined milking stools and milk pail supports, and has for one of its objects to improve the construction and increase the efficiency and utility of devices of this character.

Another object of the invention is to provide a device of this character which combines a convenient seat and a milk pail holder or support arranged in compact form, and which may be readily transported from place to place.

With these and other objects in view the invention consists in certain novel features of construction as hereafter shown and described and then specifically pointed out in the claim, and in the drawings illustrative of the preferred embodiment of the invention, the figure is a perspective view of the improved device.

Corresponding and like parts are referred to in the following description and indicated in all the views of the accompanying drawings by the same reference characters.

The improved device comprises in general a supporting frame including a rear elevated portion to support a seat and a forward lower portion to support a milking pail. The frame comprises a rear support or leg 10 and a forward support comprising a horizontal portion 11 and depending legs 12—13, with the seat 14 connected by bolts or other fastening devices to the horizontal portion 11 of the forward support and the upwardly directed inward portion 15 of the leg 10. At their lower ends the members 10—12—13 are outturned to form feet to increase the stability of the seat. By this means a three legged stool device is provided, as shown.

The support for the pail comprises spaced side members 16—17 united at their rear ends to a tie rod 19 extending through the leg portions 12—13. At their forward ends the side members 16—17 are extended downwardly to form additional supporting legs 20—21. At their rear or inner ends the members 16—17 are twisted one fourth around to form bearings through which the rod 19 passes. The members 16—17 provide a suitable support for a pail rest 22 which is bolted or otherwise secured thereto, as shown. The rear leg 10 is provided with a suitable brace 23. A pail guard device is employed, comprising L shaped side rods 24—25 having eyes at one end to receive bolts 26—27 by which the horizontal portion 11 of the forward support is connected and directed downwardly at their forward ends and provided with eyes to engage the forward bolts 28—29 by which the pail rest 22 is supported. The side guards 24—25 are connected by a forward combined brace and guard 30 having eyes at the ends engaging around the side guards 24—25. By this means the pail is effectually supported and prevented from lateral displacement when in use, while at the same time the pail is readily removable when required.

All of the parts of the improved device except the seat 14 and the pail rest 22 are of metal and the framework open and readily accessible so that it can be maintained in sanitary condition.

Having thus described my invention what I claim as new is:—

A combined milking stool and pail support comprising a seat, a forward frame including a horizontal member and depending leg members spaced apart, forwardly directed side members connected to said leg members, a tie rod extending through said leg members and said side members, a pail support carried by said side members, side guards comprising L shaped rods connected at their ends respectively to said seat and to said pail rest, and a front guard connected at its ends to said side guards.

In testimony whereof, I affix my signature in presence of two witnesses.

BERTRAM M. TUCKER. [L. S.]

Witnesses:
ADOLPH LAMBERT,
JOHN M. TALLMAN.

Copies of this patent may be obtained for five cents each, by addressing the "Commissioner of Patents, Washington, D. C."